Sept. 10, 1963     L. A. RICHARDS     3,103,117
TENSIOMETER
Filed June 22, 1960
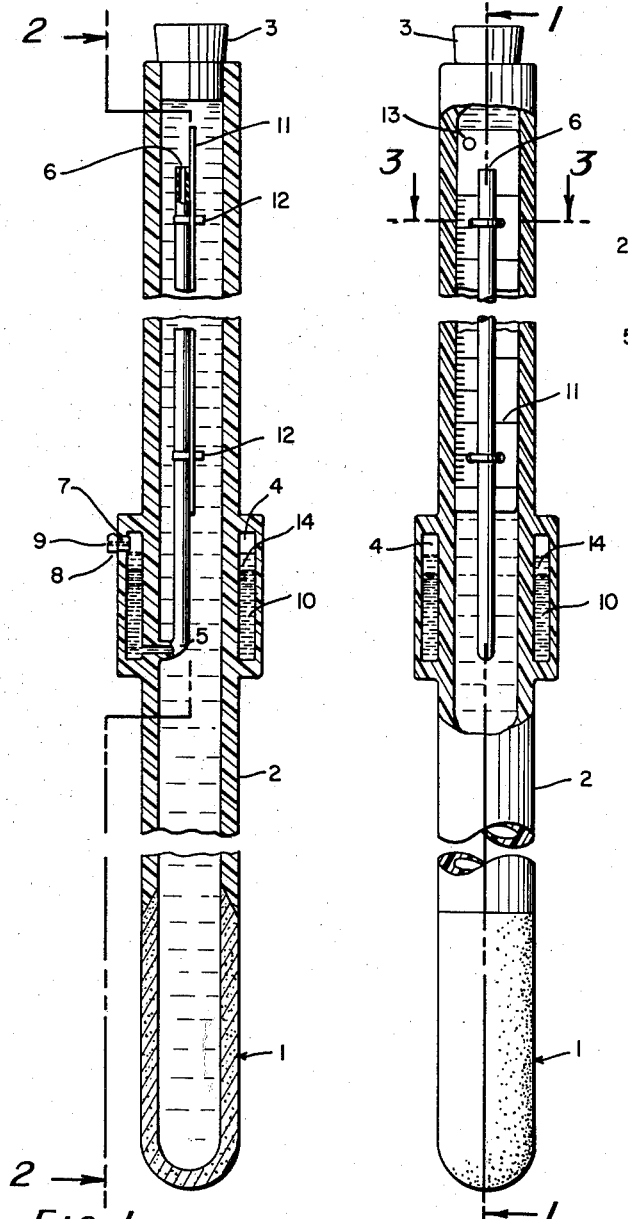
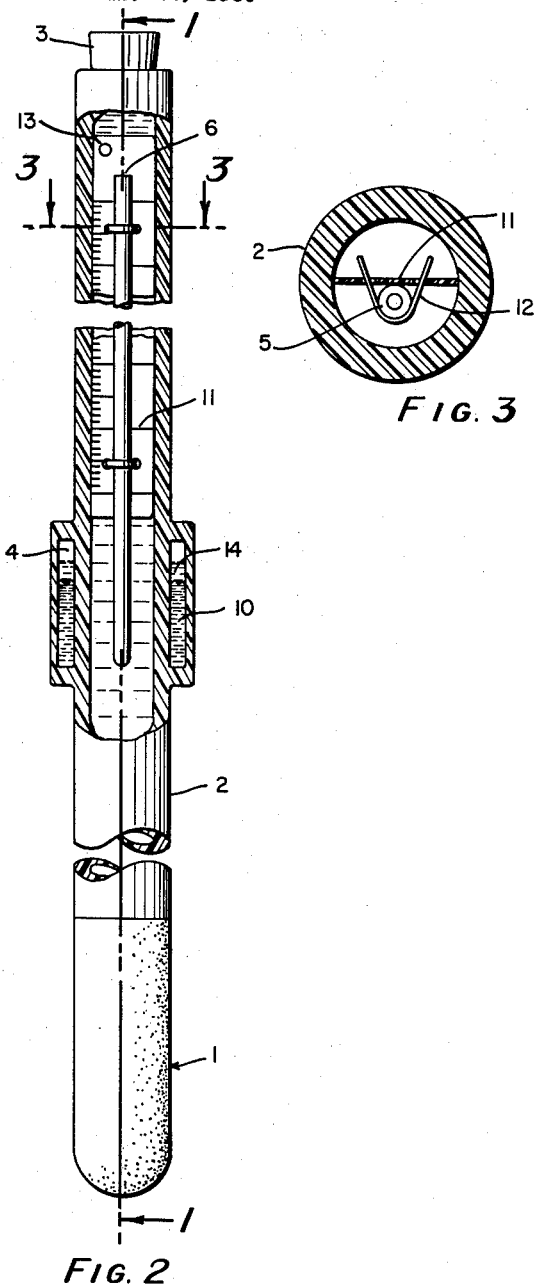
FIG. 1     FIG. 2     FIG. 3
*INVENTOR.*
LORENZO A. RICHARDS
BY
AGENT

United States Patent Office 3,103,117
Patented Sept. 10, 1963

3,103,117
TENSIOMETER
Lorenzo A. Richards, 4455 5th St., Riverside, Calif.
Filed June 22, 1960, Ser. No. 37,877
5 Claims. (Cl. 73—73)

My invention relates to soil moisture tensiometers. Such instruments consist of a permeable ceramic cell that is buried in soil and is connected to a water filled system having a vacuum gage. Drying soil sucks water from the cup causing the reading of the vacuum gage to increase. The gage indicates the suction condition of the water in the tensiometer, which in turn is in adjustment through the porous cell with suction of the soil. The gage reading therefore indicates the soil suction against which roots must operate to obtain water. Among the objects of my invention are:

First, to provide a tensiometer which utilizes a manometer to sense the suction within the tensiometer, and wherein the manometer includes a sensing tube disposed within and subject to the suction within the tensiometer, and a reservoir mounted externally of the tensiometer and subject to atmospheric pressure.

Second, to provide a tensiometer which includes an elongated transparent tube serving to visually expose but protect the manometer indicator tube and its scale.

Third, to provide a tensiometer which involves a minimum of parts, is particularly economical of manufacture and is readily constructed for the measurement of soil suction at different distances below the soil surface so as to justify the use of a sufficient number, in a region under investigation or control, to obtain accurate knowledge of the soil moisture conditions.

Fourth, to provide a tensiometer wherein the internal condition of the tensiometer and therefore the dependability of its operation is readily visible, thereby minimizing the possibility of error in the indicated readings, and permitting the installation and use by untrained persons.

With the above and other objects in view as may appear hereinafter, reference is directed to the accompanying drawings, in which:

FIGURE 1 is a fragmentary longitudinal view of the tensiometer taken through 1—1 of FIGURE 2.

FIGURE 2 is a fragmentary partial sectional, partial elevational view thereof taken through 2—2 of FIGURE 1.

FIGURE 3 is an enlarged transverse sectional view thereof taken through 3—3 of FIGURE 2.

The tensiometer includes a conventional tensiometer cell in the form of a deep cup having uniform wall thickness and formed of ceramic material or other material having pore spaces so predetermined in size and percentage of wall volume that when the interior of the cell is sealed, filled with water and exposed to surrounding soil, the vacuum or suction developed within the cell will correspond to soil suction.

The upper end of the cell 1 is cemented or otherwise bonded and sealed to a tensiometer tube 2 preferably formed of transparent plastic material. The length of the tube 2 is such that, when the cell 1 is buried to the desired depth (which may vary from a few inches to several feet), an optimum portion of the tensiometer or elongated tube 2 will project above the ground. The exposed or above ground length of the tube 2 is preferably greater than thirty inches to provide ample length for a manometer.

The upper end of the tensiometer tube 2 is adapted to receive a stopper 3 or other closure so that the interior of the tube is completely sealed. As will be brought out hereinafter, the cell 1 and tube 2 are completely filled with water, and as a consequence when installed, will develop suction corresponding to soil suction.

Surrounding and sealed to the tensiometer tube 2 is an annular manometer reservoir 4. The lower end of the reservoir is connected to a manometer indicator tube 5 of small diameter which extends upwardly in the tensiometer tube terminating in an open upper end 6. The upper portion of the annular reservoir 4 is provided with a lateral filler port 7, preferably partially closed by a small stopper 8 having a small hole 9 therethrough so that the upper side of the reservoir is exposed to atmospheric pressure. The filler port 7 is utilized to introduce a selected quantity of mercury 10 into the reservoir.

Slidably mounted on the indicator tube 5 is a scale strip 11 which is frictionally held in place on the indicator tube by U-shaped clips 12 extending around the indicator tube with their ends extending through apertures in the scale strip. A hole 13 is provided near the upper end of the scale strip 11 so that a wire or other tool may be inserted from the upper end of the tensiometer tube to engage and move the scale strip axially. The scale strip may be graduated to indicate vacuum in millimeters of mercury or other graduations selected to indicate suction of the water in the tensiometer as related to soil suction, and correspondingly to the availability of the soil water to plants.

The volume of reservoir 4 is so proportioned relatively to the volume of the indicator tube that the reservoir can accommodate the volume of mercury 10 employed as a pressure sensing liquid when the reservoir is half filled.

It should be observed that, at least that portion of the tensiometer tube in the region of the manometer indicator tube and continuing to the stopper or cap 3, is not only transparent but also serves to protect and to support the indicator tube 5 and scale strip 11.

Operation of the tensiometer is as follows:

The manometer reservoir is filled with a measured quantity of mercury which may be introduced through the filler port 7. Water, preferably boiled and cooled to remove occluded air, is poured into the tensiometer tube 2. Some of this water will flow down the indicator tube and find its way in the reservoir above the level of the mercury therein and serve to protect the mercury from oxidation. This water is shown as 14. When the tensiometer tube is completely filled, the stopper 3 is secured and the sensing cell 1 is placed about half immersed in water. Within a short time, the mercury meniscus in the indicator tube will attain a constant level or elevation. A temporary mark is made at this level on the exterior of the tensiometer tube 2 and the scale strip is adjusted by removing the stopper 3 and sliding the scale strip vertically until its zero point coincides with the temporary mark.

The tensiometer tube 2 is then filled with water and the stopper 3 is inserted. Subsequently, when the sensing cell 1 is buried in the soil so as to be in moisture transferring relation therewith, the suction that develops within the tensiometer remains in close correspondence with the soil suction, assuming that the cell and tube are completely filled with water. The elevation of the mercury in the indicator tube 5, as read on the scale strip 11 gives the value of the soil suction attained. This reading can be used, for example, for timing irrigations.

It should be observed that the diurnal variation of air temperature tends to introduce an error in the reading of the manometer. This can be compensated by utilizing as the material for the tensiometer tube a plastic having a thermal expansion corresponding closely to that of water. Certain formulations of acrylic have such a temperature coefficient.

It will also be observed that the tensiometer tube serves both to protect and to support the indicator tube and scale strip of the manometer, and in so doing greatly reduces the cost as compared to the provision of a completely external manometer or vacuum gage. This is of particular importance, when it is realized that instruments of this type are installed in full exposure to the weather. Furthermore, the "fool proof" characteristic of the instrument is materially enhanced.

By utilizing transparent material for the tensiometer tube the condition of the instrument is readily apparent so that even with cursory inspection, one can determine whether or not the instrument is functioning properly, and whether or not air exists in the system. If this is so, it is only necessary to remove the stopper 3 and fill with water.

Although a particular embodiment of the invention has been shown and described, the invention is not limited thereto, but includes the constructions, combinations and arrangements embraced in the appended claims.

I claim:

1. A tensiometer, comprising: a porous soil moisture sensing cell; an elongated tube extending upwardly therefrom; a removable closure for the upper end of said tube, said cell and tube adapted to be filled with water and sealed by said closure whereby, upon burying said cell in soil, a suction develops in said tube corresponding to soil suction; and a manometer including an indicating tube disposed longitudinally of and within the upper portion of said elongated tube and open at its upper end for exposure to the suction in said elongated tube, a reservoir disposed externally of said elongated tube exposed to atmospheric pressure and communicating with said indicating tube, a manometer liquid in said indicating tube and reservoir and a scale strip disposed within and protected by said elongated tube in cooperative relation to said indicating tube; said elongated tube being transparent at least in the region of said indicating tube.

2. A tensiometer, comprising: a porous tensiometer cell closed at its lower end and open at its upper end; an elongated tensiometer tube formed of transparent material and sealed to said cell; a removable closure for the upper end of said tensiometer tube whereby on filling said cell and tube with water and burying said cell in soil, suction develops in said tensiometer tube corresponding to soil moisture tension; a manometer including an indicating tube and scale disposed in and protected by said tensiometer tube and subjected to suction therein, and a reservoir sealed to and disposed externally of said tensiometer tube, communicating with said indicating tube and exposed to atmospheric pressure, and a manometer liquid consisting of mercury in said reservoir and indicating tube.

3. A tensiometer, comprising: a porous soil moisture sensing cell; a transparent elongated tube extending upwardly therefrom; a removable closure for the upper end of said tube, said cell and tube adapted to be filled with water and sealed by said closure whereby, upon burying said cell in soil, a suction develops in said tube corresponding to soil suction; a manometer including an indicating tube disposed longitudinally within and protected by said elongated tube, an annular reservoir sealed to and surrounding said elongated tube and communicating with the lower end of said indicating tube, and mercury in said reservoir and indicating tube, the upper ends of said indicating tube and reservoir being exposed respectively to suction in said elongated tube and to atmospheric pressure externally of said tube and a scale strip disposed within and protected by said elongated tube and in cooperative relation with said indicating tube.

4. A tensiometer, comprising: a porous soil moisture sensing cell; a transparent elongated tube extending upwardly therefrom; a removable closure for the upper end of said tube; said cell and tube adapted to be filled with water and sealed by said closure whereby, upon burying said cell in soil, a suction develops in said tube corresponding to soil suction; a manometer including an indicating tube disposed longitudinally within and protected by said elongated tube, an annular reservoir sealed to and surrounding said elongated tube and communicating with the lower end of said indicating tube, and mercury in said reservoir and indicating tube, the upper ends of said indicating tube and reservoir being exposed respectively to suction in said elongated tube and to atmospheric pressure externally of said tube; a scale strip disposed within and protected by said elongated tube and in cooperative relation with said indicating tube; means adjustably supporting said scale strip on said indicating tube; and means accessible from the upper end of said elongated tube for adjusting said scale strip longitudinally relatively to said indicating tube.

5. The combination with a tensiometer having a porous cell and a transparent elongated tube sealed to and extending upwardly from said cell, of a manometer, comprising: an indicating tube disposed within and protected by said elongated tube; an annular reservoir mounted and sealed rigidly on said elongated tube externally thereof and communicating with the lower end of said indicating tube; and a manometer liquid in said reservoir and indicating tube exposed at said reservoir to atmospheric pressure and at the extremity of said indicating tube to vacuum within said elongated tube and a scale strip disposed within and protected by said elongated tube and in cooperative relation with said indicating tube.

References Cited in the file of this patent

UNITED STATES PATENTS

| 355,381 | Chapman | Jan. 4, 1887 |
| 1,481,952 | Bacharach | Jan. 29, 1924 |
| 1,582,942 | Thomas | May 4, 1926 |
| 2,801,538 | Matson | Aug. 6, 1957 |

FOREIGN PATENTS

| 435,815 | Germany | Oct. 18, 1926 |
| 158,349 | Australia | Aug. 14, 1954 |